Figure 6:
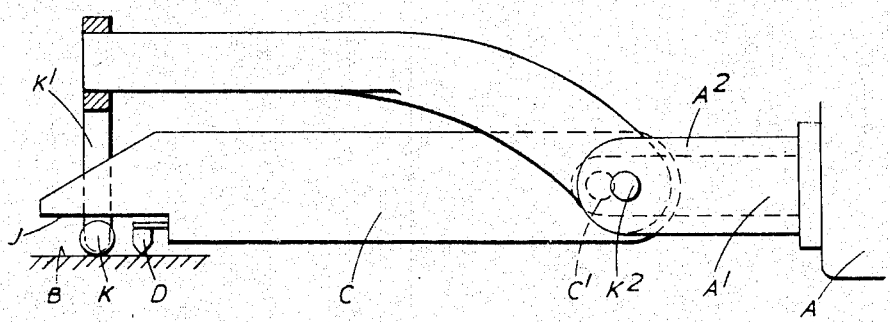

Nov. 28, 1944.  R. E. REASON  2,363,691
APPARATUS FOR MEASURING OR INDICATING THE
DEGREE OF SURFACE ROUGHNESS
Filed Sept. 16, 1942  2 Sheets-Sheet 1
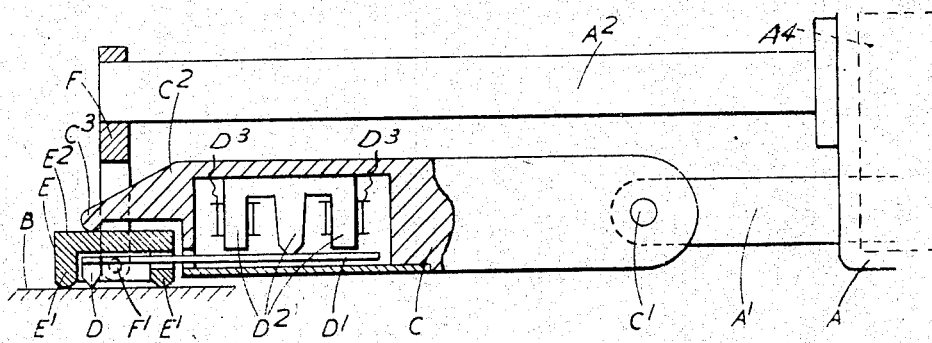
FIG. 1
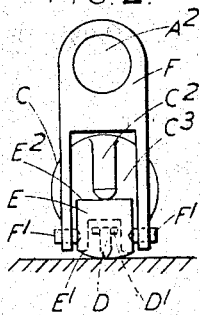 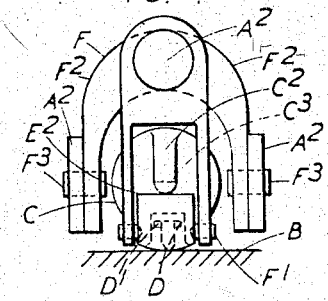
FIG. 2   FIG. 4
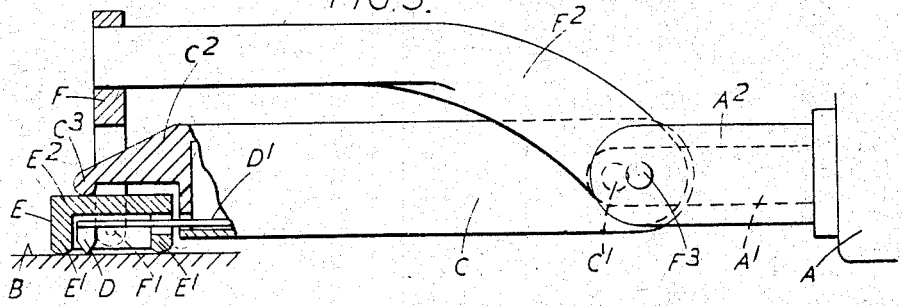
FIG. 3
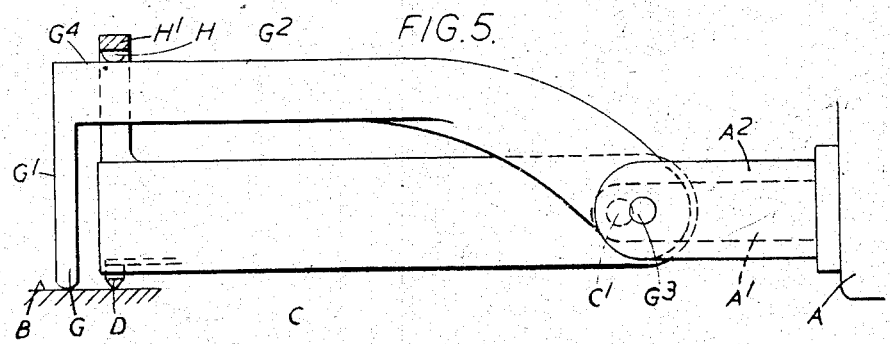
FIG. 5
Inventor
R. E. REASON
By
Emery Holcombe Blair
Attorneys Inventor
R. E. REASON.

Patented Nov. 28, 1944

2,363,691

UNITED STATES PATENT OFFICE 2,363,691

APPARATUS FOR MEASURING OR INDICATING THE DEGREE OF SURFACE ROUGHNESS

Richard Edmund Reason, Leicester, England, assignor to Kapella Limited, Leicester, England, a company of Great Britain Application September 16, 1942, Serial No. 458,560
In Great Britain September 16, 1941

9 Claims. (Cl. 73—104)

This invention relates to apparatus for measuring or indicating the shape of a surface or the degree of roughness thereof by means of a stylus or equivalent member which is traversed over the surface, and is more especially concerned with a pick-up device for use in such apparatus. It has been proposed in such apparatus to provide on the pick-up head carrying the stylus a skid, which may be for instance in the form of a ball or roller or like device engaging over an appreciable area of the surface to be tested or of an additional surface substantially parallel thereto, in order to provide a datum to which the movements of the stylus normal to the test surface can be referred.

The pick-up device according to the present invention comprises a supporting casing, a pick-up head movable relatively thereto, a stylus or equivalent member so carried by the pick-up head that movement thereof will cause the stylus to be traversed over the test surface but will leave the stylus free to move in a direction normal to the direction of traversing, an electromagnetic or other device carried by the pick-up head and responsive to the transverse movements of the stylus, and a guiding device incorporating two relatively movable elements constituted by a reference surface and a cooperating skid and provided with means whereby the reference surface is automatically set so that its line of intersection with the traversing plane (that is the plane of movement of the stylus) is substantially parallel to the line of intersection of such plane with the test surface, one of the two elements of the guiding device being on the pick-up head and the other on a member which rests on the test surface and is so connected to the casing as to remain stationary during traversing of the stylus.

The guiding device may be arranged in various ways. Thus in one arrangement the stationary member resting on the test surface bears the reference surface and is so shaped and mounted that when brought in contact with the test surface it will automatically take up a position in which the lines of intersection of the traversing plane with the reference surface and with the test surface are substantially parallel to one another. In an alternative arrangement, wherein the stationary member again bears the reference surface, the mounting of this member is so inter-related with the mounting of the pick-up head that, when the member and the stylus are both in contact with the test surface, the lines of intersection of the traversing plane with the test surface and with the reference surface will automatically lie substantially parallel to one another when the stylus occupies a predetermined position relative to the pick-up head. In another arrangement the pick-up head bears the reference surface, and the stationary member acts as a distance piece between the test surface and the reference surface of such dimensions that the lines of intersection of the traversing plane with the test surface and with the reference surface will automatically lie substantially parallel to one another when the stylus occupies a predetermined position relative to the pick-up head.

Conveniently the pick-up head is pivotally mounted on an arm projecting from the casing and movable relatively thereto, and the stationary member is pivotally mounted on a second arm projecting from the casing. Alternatively, the stationary member being rigidly carried by the casing, which is itself pivotally mounted on adjustable stand.

Figure 7:
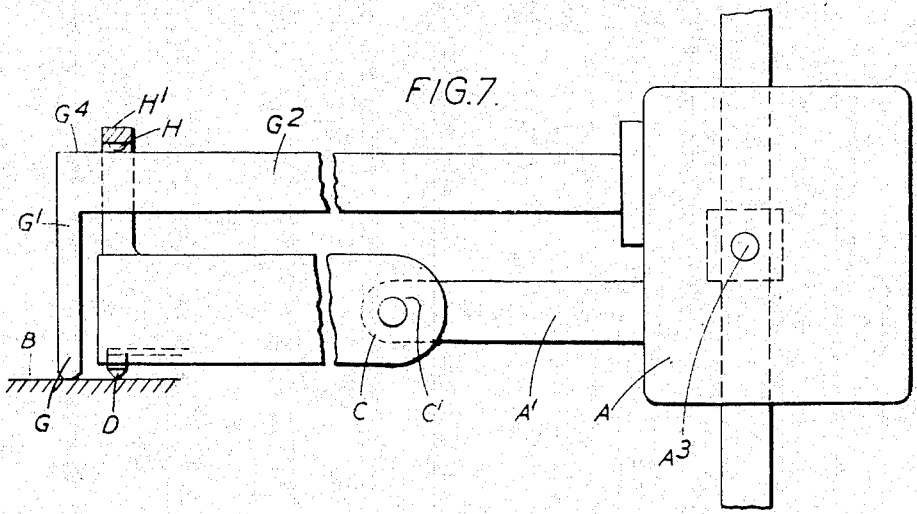

The invention may be carried into practice in various ways, but some convenient practical arrangements of pick-up device according thereto are illustrated by way of example in the accompanying drawings, in which Figure 1 is a sectional side view of one construction, Figure 2 is an end elevation of the construction of Figure 1, Figures 3 and 4 are views similar to Figures 1 and 2 showing a modification thereof, Figure 5 is a side view of an alternative construction, Figure 6 shows a further alternative construction, and Figure 7 illustrates a modification of the arrangement of Figure 5.

In the arrangement of Figures 1 and 2, which will for convenience be described with reference to its use for the measurement of surface roughness, the casing A supporting the pick-up device is mounted on an adjustable stand (not shown) which is such that the casing can be located and clamped in any desired position relative to the surface B whose roughness is to be tested. Thus in a simple form the casing is adjustable vertically on a suitable column, the necessary horizontal adjustment being effected by relative horizontal movements between the test surface B and the column.

The casing A serves for housing driving mechanism diagrammatically indicated at $A^4$ for effecting the traversing of the pick-up, the arrangement forming the subject of the present applicant's United States of America patent application Serial No. 379,536, filed February 18, 1941, preferably being employed, whereby the pick-up can be traversed at alternative slow and relatively quick speeds, as may be desired, the pick-up head being carried by an arm $A^1$ which projects horizontally from the lower part of the casing and is driven in the longitudinal direction by the mechanism $A^5$ in the casing.

The pick-up head C extends from the end of such arm $A^1$ and is pivotally mounted at $C^1$ thereof. The stylus D is carried by the armature $D^1$ of an electromagnetic device in the pick-up head C. This device comprises an E-shaped magnetic core $D^2$ having coils $D^3$ on its outer limbs, the armature $D^1$ being pivoted to the free end of the center limb so that the stylus can move in a direction substantially perpendicular to the direction of traversing, the movements of the stylus D in space thus being confined to a plane, which may be termed the traversing plane. The current flowing in the coils $D^3$ of the electromagnetic device thus varies in accordance with the transverse movements of the stylus D (that is, in use, the movements of the stylus substantially normal to the test surface D during traversing), and is utilized to control suitable instruments for giving the desired measurement or indication of the surface roughness, the arrangement preferably being of one or other of the kinds described in the specifications of United States of America patent applications Serial Nos. 381,920, filed March 5, 1941, 378,836, filed February 13, 1941, in the names of the present applicant and another.

Beyond the end of the pick-up head C and separate therefrom is a member E having two spherical or toroidal feet $E^1$ resting on the test surface B, these feet each engaging with the surface over an appreciable area sufficient to cover several "crests" of roughness of the surface and having their centres in the traversing plane. The upper plane surface $E^2$ of this member E is highly polished and is parallel to a plane tangent to the surfaces of the two feet $E^1$, so that when the member rests on a plane test surface B, the polished upper surface $E^2$ will lie parallel to the line of intersection of the traversing plane with the test surface and preferably with the test surface itself, although strict accuracy in parallelism in the direction normal to the direction of traversing is not essential. In cases where the test surface B is not a plane surface, the polished upper surface $E^2$ of the member E should be shaped to conform to the test surface, so that its intersection with the traversing plane will lie parallel to the intersection of such plane with the test surface. In sliding engagement with the polished upper surface $E^2$ of this member E is a skid $C^3$, which may consist of the rounded end of a lug $C^2$ extending from the pick-up head C or of a ball or roller carried by such lug.

This member E is pivoted about an axis $F^1$ perpendicular to the traversing plane, to the lower end of a yoke F extending down from the end of a second arm $A^2$, which extends from the casing A above the traversing arm $A^1$ and is fixed to the casing. Alternatively (as shown in Figures 3 and 4) the yoke F may be carried on a bracket $F^2$ pivoted to such second arm $A^2$, the pivot $F^3$ lying approximately in line with the mean position of the pivot $C^1$ between the pick-up head C and the traversing arm $A^1$.

This latter alternative has the advantage of avoiding risk of damage to the parts which might otherwise occur if the member E were forced too hard into engagement with the test surface B during adjustment of the stand.

It will be clear that with this arrangement, the relative adjustment of the stand and the test surface B will bring the member E into engagement with the surface, so that the pick-up head C will move parallel to the surface during traversing of the arm $A^1$ owing to the engagement of the skid $C^3$ with the polished upper surface $E^2$ of the member E. Since the member E itself remains stationary during the traversing, the movement of the pick-up head C will be independent of any irregularities in the test surface B, and the polished upper surface $E^2$ of the member will thus constitute a smooth datum reference surface for the movements of the stylus D normal to the test surface, and will thus enable a true indication to be obtained of the fluctuations due to roughness in the profile of a section through the test surface B, irrespective of whether or not the test surface is accurately parallel to the direction of traversing. The stylus D preferably projects between the feet $E^1$ of the member E so as to engage with the test surface B in the area between the feet.

In the arrangement of Figure 5 the stationary member has only a single foot G located a short distance beyond the outermost position of the pick-up head C. The member itself is in this arrangement L-shaped, with its short leg $G^1$ extending vertically from the single foot G and its longer leg $G^2$ extending horizontally from the top of the short leg $G^1$ and pivoted at $G^3$ to the fixed second arm $A^2$ projecting from the casing A, such pivot $G^3$ again being located in line with the mean position of a pivot $C^1$ between the pick-up head C and the traversing arm $A^1$. Part of the surface $G^4$ of the long leg $G^2$, that is the upper surface of the member, is polished to act as a reference surface and is engaged by a skid H on a yoke $H^1$ extending up from the pick-up head C, above the stylus D.

In this arrangement the automatic setting of the upper surface $G^4$ of the stationary member depends on the adjustments of the electrical circuits through which the electromagnetic device operates the instruments. For simplicity of description it will be assumed that the instrument or one of the instruments consists of a pen recorder which plots a greatly magnified trace of the profile of a section of the test surface B. In such case, for any given magnification and setting of the electrical circuits, there will theoretically be one position of the pen on the recorder chart corresponding to each position of the stylus D relatively to the pick-up head C (although in practice of course with a large magnification only a very limited range of such positions will in fact come within the actual dimensions of the chart and the practical limits of movement of the pen). If now the electrical circuits are so set that, for the particular position of the stylus D at which the pen lies in the middle of the chart, the distance between the stylus and the skid H is substantially equal to the length of the short leg $G^1$ of the stationary member measured from the foot G to the polished upper surface $G^4$, then it will be clear that when the stand has been so adjusted relatively to the test surface B that the pen comes close to the middle of the chart, the lines of intersection of the traversing plane with the test surface B and with the reference surface G⁴ will be automatically set substantially parallel to one another.

In order to cater for different magnifications, without the necessity for providing a different stationary member for each magnification, the necessary condition of parallelism between the reference surface and the test surface when the pen is in the middle of the chart can be achieved by providing a backing-off control in the connection between the pick-up and the instrument, such control preferably being ganged with the magnification adjustment.

In the arrangement of Figure 6 the reference surface J is on the pick-up head C and the skid K on the stationary member, the skid being conveniently in the form of a ball acting as a distance piece between the reference surface J and the test surface B. The ball is carried by a vertical yoke K¹ constituting the short arm of an L-shaped member which is pivoted at K² to a fixed second arm A² projecting from the casing A as in the arrangement of Figure 5.

This arrangement operates in a manner analogous to that described for Figure 5, the setting of the electrical circuits for any given magnification being such that when the pen is in the middle of the chart the perpendicular distance of the stylus D from the reference surface J is equal to the diameter of the ball K, so that the lines of intersection of the traversing plane with the test surface B and with the reference surface J will automatically be set parallel to one another when the pen is in the middle of the chart.

The arrangements of Figures 5 and 6 may each be modified, if desired, by omitting the pivot G³ or K² between the arm A² and the L-shaped member G² or K¹, the whole casing A being pivotally mounted. Figure 7 shows such a modification of the arrangement of Figure 5, and it will be seen that the long arm G² of the L-shaped member is rigidly connected to the casing A, the pick-up head C still being pivoted to the traversing arm A¹, and the casing A is pivoted at A³ to a bracket adjustable on the supporting stand.

This alternative has the advantage that it is unnecessary for the test surface B to be mounted horizontally or approximately horizontally, since when the device is properly adjusted the direction of traversing will always be parallel to the reference surface G⁴ and therefore to the test surface B. When the casing A is not pivoted and a pivot is provided in the arm A², it is essential that any inclination of the test surface B to the horizontal should be relatively small, since the direction of traversing of the arm A¹ is horizontal, and the angle between the directions of traversing of the arm A¹ and of the stylus D will necessarily introduce a slight error into the measurement or indication (such error however being negligible so long as the angle is small).

Although the above arrangements have been described with reference to the measurement or indication of surface roughness, they may also be employed with slight modification for investigation of the accuracy of the general shape of the test surface in comparison with the known shape of the reference surface. For this purpose the stylus would have a blunt or rounded end and the traversing mechanism would be modified to give a considerably greater length of traverse. It is also desirable in this modification for the casing A to be pivotally mounted as in Figure 7, instead of pivoting the stationary member to the arm projecting from the casing.

It will be appreciated that the foregoing arrangements have been described by way of example only and may be modified in various ways within the scope of the invention.

What I claim as my invention and desire to secure by Letters Patent is:

1. A pick-up device for use in apparatus for measuring or indicating the shape of a surface or the degree of roughness thereof, comprising a supporting casing, a pick-up head, means for moving the pick-up head relatively to the casing, a stylus so carried by the pick-up head that movement of the head will cause the stylus to be traversed over the surface to be tested but will leave the stylus free to move transversely in a direction substantially normal to the direction of traversing, a detecting device carried by the pick-up head and responsive to the transverse movements of the stylus, a member resting on the test surface and so connected to the casing as to remain stationary during traversing of the stylus, two relatively movable elements together constituting a guiding device and respectively constituted by a reference surface and a cooperating skid, one of such elements being on the pick-up head and the other on the stationary member, and means whereby the reference surface is automatically set so that its line of intersection with the traversing plane is substantially parallel to the line of intersection of such plane with the test surface.

2. A pick-up device for use in apparatus for measuring of indicating the shape of a surface or the degree of roughness thereof, comprising a supporting casing, an arm carried by the casing and movable relatively thereto, a pick-up head pivoted to such arm, a stylus so carried by the pick-up head that movement of the head will cause the stylus to be traversed over the surface to be tested but will leave the stylus free to move transversely in a direction substantially normal to the direction of traversing, a detecting device carried by the pick-up head and responsive to the transverse movements of the stylus, a second arm carried by the casing and fixed relatively thereto, a member pivoted to the second arm and resting on the test surface such member remaining stationary during traversing of the stylus, two relatively movable elements together constituting a guiding device and respectively constituted by a reference surface and a cooperating skid, one of such elements being on the pick-up head and the other on the stationary member, and means whereby the reference surface is automatically set so that its line of intersection with the traversing plane is substantially parallel to the line of intersection of such plane with the test surface.

3. A pick-up device for use in apparatus for measuring or indicating the shape of a surface or the degree of roughness thereof, comprising an adjustable stand, a supporting casing pivotally mounted thereon, an arm carried by the casing and movable relatively thereto, a pick-up head pivoted to such arm, a stylus so carried by the pick-up head that movement of the head will cause the stylus to be traversed over the surface to be tested but will leave the stylus free to move transversely in a direction substantially normal to the direction of traversing, a detecting device carried by the pick-up head and responsive to the transverse movements of the stylus, a member rigidly connected to the casing and resting on the test surface such member remaining stationary during traversing of the stylus, two relatively movable elements together constituting a guiding device and respectively constituted by a reference surface and a cooperating skid, one of such elements being on the pick-up head and the other on the stationary member, and means whereby the reference surface is automatically set so that its line of intersection with the traversing plane is substantially parallel to the line of intersection of such plane with the test surface.

4. A pick-up device for use in apparatus for measuring or indicating the shape of a surface or the degree of roughness thereof, comprising a supporting casing, a pick-up head, means for moving the pick-up head relatively to the casing, a stylus so carried by the pick-up head that movement of the head will cause the stylus to be traversed over the surface to be tested but will leave the stylus free to move transversely in a direction substantially normal to the direction of traversing, a detecting device carried by the pick-up head and responsive to the transverse movements of the stylus, a member bearing a reference surface and so shaped that when in contact with the test surface the lines of intersection of the reference and test surfaces with the traversing plane will be substantially parallel to one another, connecting means between such member and the casing whereby the member will remain stationary on the test surface during traversing of the stylus, and a skid on the pick-up head cooperating with the reference surface and thereby guiding the head during the traversing movement.

5. A pick-up device for use in apparatus for measuring or indicating the shape of a surface or the degree of roughness thereof, comprising a supporting casing, an arm carried by the casing and movable relatively thereto, a pick-up head pivoted to such arm, a stylus so carried by the pick-up head that movement of the head will cause the stylus to be traversed over the surface to be tested but will leave the stylus free to move transversely in a direction substantially normal to the direction of traversing, a detecting device carried by the pick-up head and responsive to the transverse movements of the stylus, a member bearing a reference surface and so shaped that when in contact with the test surface the lines of intersection of the reference and test surfaces with the traversing plane will be substantially parallel to one another, a second arm carried by the casing and fixed relatively thereto, a pivotal connection between such members and the second arm whereby the member will rest on the test surface and will remain stationary during traversing of the stylus, and a skid on the pick-up head cooperating with the reference surface and thereby guiding the head during the traversing movement.

6. A pick-up device for use in apparatus for measuring or indicating the shape of a surface or the degree of roughness thereof, comprising a supporting casing, an arm carried by the casing and movable relatively thereto, a pick-up head pivoted to such arm, a skid on the pick-up head, a stylus so carried by the pick-up head that movement of the head will cause the stylus to be traversed over the surface to be tested but will leave the stylus free to move transversely in a direction substantially normal to the direction of traversing, a detecting device carried by the pick-up head and responsive to the transverse movements of the stylus, a member having a foot resting on the test surface and bearing a reference surface, and a connection between such member and the casing whereby the member will remain stationary during traversing of the stylus, the dimensions of the aforesaid parts being such that when the stylus is in contact with the test surface and occupies a predetermined position relatively to the pick-up head the skid will be separated from the line of intersection of the test surface with the traversing plane by a distance substantially equal to the separation of the foot from the line of intersection of the reference surface with the traversing plane whereby such lines of intersection will lie substantially parallel to one another.

7. A pick-up device as claimed in claim 6, in which the connection between the stationary member and the casing comprises an arm which is carried by the casing and is fixed relatively thereto and to which the member is pivoted, the axis of such pivot being substantially coincident with the mean position of the axis of the pivot between the pick-up head and the movable arm.

8. A pick-up device for use in apparatus for measuring or indicating the shape of a surface or the degree of roughness thereof, comprising a supporting casing, a pick-up head bearing a reference surface, means for moving the pick-up head relatively to the casing, a stylus so carried by the pick-up head that movement of the head will cause the stylus to be traversed over the surface to be tested but will leave the stylus free to move transversely in a direction substantially normal to the direction of traversing, a detecting device carried by the pick-up head and responsive to the transverse movements of the stylus, and a member so connected to the casing as to remain stationary during traversing of the stylus and acting as a distance piece between the test surface and the reference surface of such dimensions that the lines of intersection of the traversing plane with the reference surface and with the test surface will lie substantially parallel to one another when the stylus occupies a predetermined position relatively to the pick-up head.

9. A pick-up device for use in apparatus for measuring or indicating the shape of a surface or the degree of roughness thereof, comprising a supporting casing, an arm carried by the casing and movable relatively thereto, a pick-up head bearing a reference surface and pivoted to such arm, a stylus so carried by the pick-up head that movement of the head will cause the stylus to be traversed over the surface to be tested, but will leave the stylus free to move transversely in a direction substantially normal to the direction of traversing, a detecting device carried by the pick-up head and responsive to the transverse movements of the stylus, a second arm carried by the casing and fixed relatively thereto, and a member pivoted to the casing so as to remain stationary during traversing of the stylus and acting as a distance piece between the test surface and the reference surface of such dimensions that the lines of intersection of the traversing plane with the reference surface and with the test surface will lie substantially parallel to one another when the stylus occupies a predetermined position relatively to the pick-up head.

RICHARD EDMUND REASON.